(12) United States Patent
Mikhailov et al.

(10) Patent No.: US 7,720,049 B1
(45) Date of Patent: May 18, 2010

(54) SEMANTIC SERVICE BROKER FOR TELECOMMUNICATIONS NETWORKS

(75) Inventors: Vladimir Mikhailov, San Jose, CA (US); Romolo Raffo, Mountain View, CA (US); Kanad Das, San Jose, CA (US); Seshagiri Rao, San Jose, CA (US); Shawn Pouliotte, San Ramon, CA (US)

(73) Assignee: Veraz Networks, Inc., San Jose, CA (US)

( * ) Notice: Subject to any disclaimer, the term of this patent is extended or adjusted under 35 U.S.C. 154(b) by 1378 days.

(21) Appl. No.: 11/071,962

(22) Filed: Mar. 3, 2005

(51) Int. Cl.
*H04L 12/66* (2006.01)
(52) U.S. Cl. .................... 370/352; 379/201.12
(58) Field of Classification Search ............. 370/352; 379/201.12
See application file for complete search history.

(56) References Cited

U.S. PATENT DOCUMENTS

| | | | |
|---|---|---|---|
| 5,337,351 A | 8/1994 | Manabe et al. | |
| 5,404,396 A | 4/1995 | Brennan | |
| 5,920,618 A | 7/1999 | Fleisher, III et al. | |
| 5,999,610 A * | 12/1999 | Lin et al. ................ | 379/207.02 |
| 6,080,202 A | 6/2000 | Strickland et al. | |
| 6,141,407 A | 10/2000 | Fritsche | |
| 6,445,782 B1 | 9/2002 | Elfe et al. | |
| 6,606,610 B1 | 8/2003 | Gray et al. | |
| 6,639,980 B1 | 10/2003 | Weiss et al. | |
| 2002/0191590 A1 | 12/2002 | Niu et al. | |
| 2004/0230636 A1 * | 11/2004 | Masuoka et al. ............ | 708/800 |
| 2005/0033808 A1 * | 2/2005 | Cheng et al. ................ | 709/205 |
| 2006/0093115 A1 * | 5/2006 | Chen et al. ............. | 379/201.12 |

* cited by examiner

*Primary Examiner*—Creighton Smith
(74) *Attorney, Agent, or Firm*—Stinson Morrison Hecker LLP

(57) ABSTRACT

A service broker of telecommunications networks is described herein. According to one embodiment, in response to a telephony call event from a subscriber to be serviced by a plurality of services, for each of the plurality of services, a service description associated with the respective service is examined to identify which of the plurality of service is capable of handling the telephony call event, where the service description semantically describes the respective service. Thereafter, the telephony call event is distributed to one or more of the identified services that are capable of handling the telephony call event, where the telephony call event is processed by the one or more services. Other methods and apparatuses are also described.

12 Claims, 13 Drawing Sheets

Fig. 6A

If Service = 2WC & Party = Conference Leader & New Service = CW, then do now allow CW.

If Service - 3WC & Party = Participant & New Service = CW, then allow CW.

Fig. 6B

Service Profiles:

3WC Party is in TS (time shared) mode
3WC Conference Leader is in EX (exclusive) mode
CW Party is in TS mode

Service Broker Rules:

If Current Service party is in TS mode and New Service is in TS mode, then allow New Service.

If Current Service party is in EX mode, then do not allow New Service.

Service Description

Service Profile:

Including, but is not limited to, the definition of what service is doing to user and what is a model of resource usage (e.g., shared / non-shared, etc.)

Service Model:

Including, but is not limited to, the definition of how service have to be executed (e.g., service processes)

Service Invocation:

Including, but is not limited to, the definition of how service could be invoked by any service execution entity in the network.

```xml
<?xml version="1.0"?>
<ServiceBuildingBlock name="Tandem-Release">
 <ParameterList>
  <Parameter name="Call" type="call"/>
  <Parameter name="Leg" type="number"/>
  <Parameter name="DataLeg" type="number"/>
 </ParameterList>

<StateList>
  <State name="sent"/>  <!- Release Request sent ->
  <State name="response-received"/> <!- Release Response received ->
  <State name="indication-received"/> <!- Release Indication received ->
 </StateList>

<Timer name="NoReleaseResponse">
  <TerminateSbb/>
 </Timer>

<StartSbb>
  <Attach activity="serviceParameter:Call"/>
  <If><Equal><Reference value="serviceParameter:DataLeg"/><Reference value="number:0"/></Equal></If>
  <Then>
   <If><Not><ReleaseCallLegRequest call="serviceParameter:Call" leg="serviceParameter:Leg"/></Not></If>
   <Then><TerminateSbb/></Then>
  </Then>
  <Else>
   <If><Not><ReleaseCallLegRequest call="serviceParameter:Call" leg="serviceParameter:Leg" dataLeg="serviceParameter:DataLeg"/></Not></If>
    <Then><TerminateSbb/></Then>
  </Else>
 </StartSbb>

<ReleaseIndication state="sent">
  <If><Equal><Reference value="event:Leg"/><Reference value="serviceParameter:Leg"/></Equal></If>
  <Then>
   <SetState state="indication-received"/>
   <SetTimer name="NoReleaseResponse" timeout="10"/>
  </Then>
 </ReleaseIndication>

<ReleaseIndication state="response-received">
  <If><Equal><Reference value="event:Leg"/><Reference value="serviceParameter:Leg"/></Equal></If>
  <Then>
   <TerminateSbb/>
  </Then>
 </ReleaseIndication>

<ReleaseCallLegResponse state="sent">
  <If><Not><Reference value="event:Status"/></Not></If>
  <Then><TerminateSbb/></Then>
  <SetState state="response-received"/>
 </ReleaseCallLegResponse>

<ReleaseCallLegResponse state="indication-received">
  <TerminateSbb/>
```

Fig. 7B

| Events | Service 1 | Service 2 | Service 3 | ... | Service N |
|---|---|---|---|---|---|
| Event 1 | * | * |  |  |  |
| Event 2 |  | * | * |  |  |
| ... |  |  |  | ... | * |
| Event N | * | * |  |  | * |

Fig. 8A

| Subscribers | Service 1 | Service 2 | Service 3 | ... | Service N |
|---|---|---|---|---|---|
| Subscriber 1 | * | * | | ... | |
| Subscriber 2 | | * | * | ... | * |
| ... | | | | ... | |
| Subscriber N | * | | * | ... | * |

Fig. 8B

| No. | Feature Title | OffHook | OnHook | FlashHook | Dialed Digits | Connect Media |
|---|---|---|---|---|---|---|
| 1 | Call Origination | V | | V | | V |
| 2 | Call Termination | | V | V | | V |
| 3 | Call Waiting | | | V | | |
| 4 | Call Transfer | | V | V | V | V |
| 5 | 3 Way Call | V | | V | V | V |
| 6 | Call Hold | | | V | V | |

Fig. 10

SEMANTIC SERVICE BROKER FOR TELECOMMUNICATIONS NETWORKS

FIELD OF THE INVENTION

The present invention relates generally to telecommunications networks. More particularly, this invention relates to a service broker for telecommunications networks.

BACKGROUND OF THE INVENTION

Among the many trends in telecommunications, increasing Internet traffic is probably the most obvious. Behind this explosive growth are the millions of new users, richer content like multi-media, and the migration of corporate voice and data traffic onto the Internet. Today, escalating Internet traffic demands are pushing beyond the limits of today's switching architectures, forcing carriers to rethink their network strategies. An entirely new generation of highly scalable switching technology is necessary to meet the requirements of today's network users. In addition, digitized information can be combined not only with other voice conversations, but it can be then merged with other formats such as facsimile, video and Internet traffic. Convergence implies that the collective conglomeration of media formats and sources is more efficiently transported on a single network rather than individual special use networks. The physical work and right a way access rights required to lay fiber creates an economy of scale such that digging one trench is easier than several parallel trenches.

Telecommunication carrier owners are understandably reluctant to discard billions of dollars of legacy equipment yet realize that the Public System Telephone Network (PSTN) will need to evolve into something completely different to handle the demands of today's users. Because the volume of telecommunications traffic is predominantly data, it is no longer sensible to create and maintain two parallel networks, one for voice and a second one for data. Voice and data networks are converging. Most carriers agree that the equipment using either Asynchronous Transfer Mode (ATM) or Internet Protocol (IP) is much less costly and more efficient than circuit switching. Distributive software paired with a packet-based architecture can now achieve the same functionality as a Class 5 telecommunications switch. Industry players are realizing that the "Softswitch" is the answer to transforming PSTN networks into a more flexible, scalable solution that can accommodate the increasing data traffic and provide the carriers with the ability to generate revenue through value-added services. Consequently, Softswitch architectures are emerging as the next-generation solution to converged voice and data networks.

Softswitch is a concept of separating the network hardware from network software. In traditional circuit switched networks, hardware and software is not independent. Circuit switched networks rely on dedicated facilities for inter-connection and are designed primarily for voice communications. The more efficient packet based networks use the IP protocol to efficient route voice and data over diverse routers and shared facilities.

As a number of new services deployed every day, traditional switches reached a scalability limit, where service delivery time is far in excess of modern business requirements. The service execution environment scalability can be measured by the number of services, the number of application services, and the service delivery time. The reasons of the slow service delivery in the traditional switches may result from the complexity of integration and the complexity of integration of the new service with other existing services.

In addition, a next generation network is adding new complexities to the problems including an increase in the number of service execution environments (e.g., proxies, end user devices, application servers, media servers, etc.), a more diversity of service execution environment (e.g., SIP, Parlay, IN, etc.), and a need to integrate applications developed by several vendors, who are not necessarily following the same service implementation philosophy.

SUMMARY OF THE INVENTION

A service broker of telecommunications networks is described herein. According to one embodiment, in response to a telephony call event from a subscriber to be serviced by a plurality of services, for each of the plurality of services, a service description associated with the respective service is examined to identify which of the plurality of service is capable of handling the telephony call event, where the service description semantically describes the respective service. Thereafter, the telephony call event is distributed to one or more of the identified services that are capable of handling the telephony call event, where the telephony call event is processed by the one or more services.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 6A is a diagram illustrating a typical service policy.

FIG. 6B is a diagram illustrating an exemplary service policy according to one embodiment.

FIG. 7A is a diagram illustrating an exemplary service description according to one embodiment.

FIG. 7B is a diagram illustrating exemplary reusable primitives according to one embodiment.

FIGS. 8A and 8B are diagrams illustrating an exemplary depository according to certain embodiments.

FIG. 10 is a block diagram illustrating an exemplary event/service table according to one embodiment of the invention.

DETAILED DESCRIPTION

A service broker of telecommunications networks is described herein. In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to one embodiment, a service broker, also referred to as a service coordination function, is utilized to architecturally mediates between systems level services (e.g., call/session control, location, presence, messaging, billing, and network resources) and both application providers' services (e.g., service provider portal) and also end user application environment. The main service broker function is service execution coordination.

In one embodiment, a service broker utilizes a common framework for service introduction, delivery, and/or execution in a multi-vendor environment. Thus, a service broker may add some implementation discipline and make new services from different vendors more suitable for the integration. In addition, a service broker may reduce the complexity of real-time service integration, where the integration of services that follows the common service framework is less complex than customized integration of disparate service implementation. Furthermore, a service broker enables reuse of the common system services and the common service building blocks. As a result, it reduces service development time through reuse.

Further, a service broker reduces complexity of the service integration problem. In the traditional architecture, each service needs to know about all of its interactions with other services. According to one embodiment, a service broker is agnostic to individual service logic and each service does not have to know about other services. The service broker solves the service interaction problem through: (1) understanding the service conflict through a service profile based representation of the services; (2) taking control of the events distribution; (3) making decision which application should handle the event based on the profile analysis.

Figure 1:
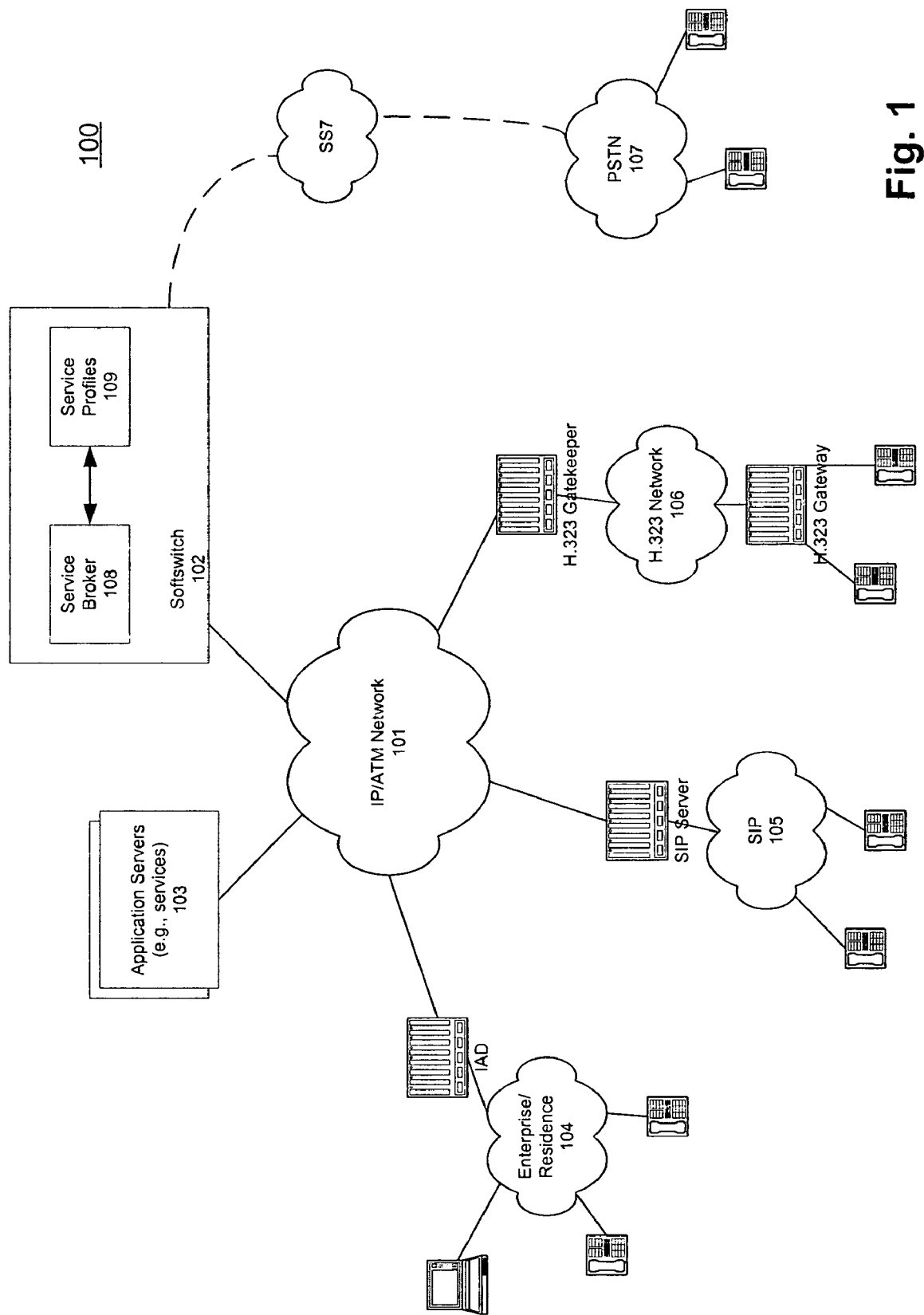
FIG. 1 is a block diagram illustrating an exemplary telecommunications network which is usable with one embodiment of the invention.

An event may be generated from a variety of features that a subscriber may have subscribed. Some of the features may include, but is not limited to:

Call Waiting
Call Forward All
Call Forward Busy Line
Call Forward Don't Answer (CFDA)
CFDA Subscriber Ring Control
Remote Activation of Call Forwarding
Three-Way Calling
Call Transfer
Call Pickup
Distinctive Ringing
Do Not Disturb
Calling Number Delivery
Calling Number Delivery Blocking
Caller ID with Call Waiting
Calling Name Delivery
Calling Name Delivery during AC/AR Ringing
Automatic Callback
Automatic Recall
Unidentified Call Rejection
Selective Call Forwarding
Selective Call Rejection
Customer Originated Trace
Business Group Line
Business Group Dialing Plan
Semi-Restricted Line
Fully-Restricted Line
Intercom Dialing
Special Intercept Announcement
Critical Inter-Digit Timing for Dialing Plan
Customer Access Treatment Code Restriction
Direct Inward Dialing/Direct Outward Dialing DID/DOD
Automatic Identified Outward Dialing
Single-Digit Dialing
Busy Line Verification
Busy Line Interrupt
E911 Operator Services FIG. 1 is a block diagram illustrating an exemplary telecommunications network which is usable with one embodiment of the invention. Referring to FIG. 1, the exemplary network 100 includes, but is not limited to, a softswitch 102 coupled to an IP/ATM network 101 to mediate between various packet and circuit-based protocols, such as, MGCP, H.232, SIP, H.248, and global PSTN signaling variants, of different networks 104-107. In addition, the softswitch 102 enables service providers (e.g., application servers 103) to have flexibility to deliver a wide variety of enhanced services to subscribers served through different types of networks (e.g., networks 104-107). Note that, the exemplary network is illustrated as an example of a telecomm network; other components apparent to an ordinary skill in the art may be included.

In one embodiment, softswitch 102 manages the flow of traffic on the network 101, including call routing, translations, and call logic. In addition, softswitch 102 enables interoperability between media gateways, networks and protocols. Further, softswitch 102 works with other key network products to optimize overall utilization. The application server 103 provides software defined features and services, including the traditional class 4 or class 5 features to which consumers are accustomed, but also advanced features which are characteristic of next generation networks. Examples of class 5 features may include call-waiting, call-forwarding, and/or conference-calling, etc.

In addition, according to one embodiment, softswitch 102 further includes a service broker 108 and service profiles 109. In one embodiment, in response to an event received from a call control engine (not shown) originated from a subscriber, softswitch 102 may determine what services the subscriber has subscribed. The softswitch 102 then accesses the service profiles 109 to determine which of the services subscribed by the subscriber is capable of handling the event. In addition, the softswitch 102 may determine if there is any conflict among the services, for example, based on an analysis of the service profiles associated with the services.

For example, consider call forwarding busy (CFB) and call waiting (CW) features. Both of these features are extensions of a terminating call (TC) feature. During normal execution of the TC feature, an incoming call is rejected if an existing call is in progress. The CFB and CW features however define deviations to this incoming call handling procedure. During execution of the CFB feature, an incoming call is forwarded to another extension if an existing call is in progress. During execution of the CW feature, a warble is generated when an incoming call is received and an existing call is in progress. If a user subscribes to both the CFB and CW features and an incoming call is received when an existing call is in progress, a conflict occurs since the incoming call cannot be forwarded to another extension and answered by the called party at the same time. According to one embodiment, the service broker of softswitch 102 is able to identify these conflicts based on the service profile analysis at runtime.

Thereafter, the softswitch 102 selects one or more of the services that are not conflict and subscribed by the subscriber to handle the event and invokes the appropriate application servers from the pool of application servers 103 to execute the services. Other configurations may exist.

Figure 2:
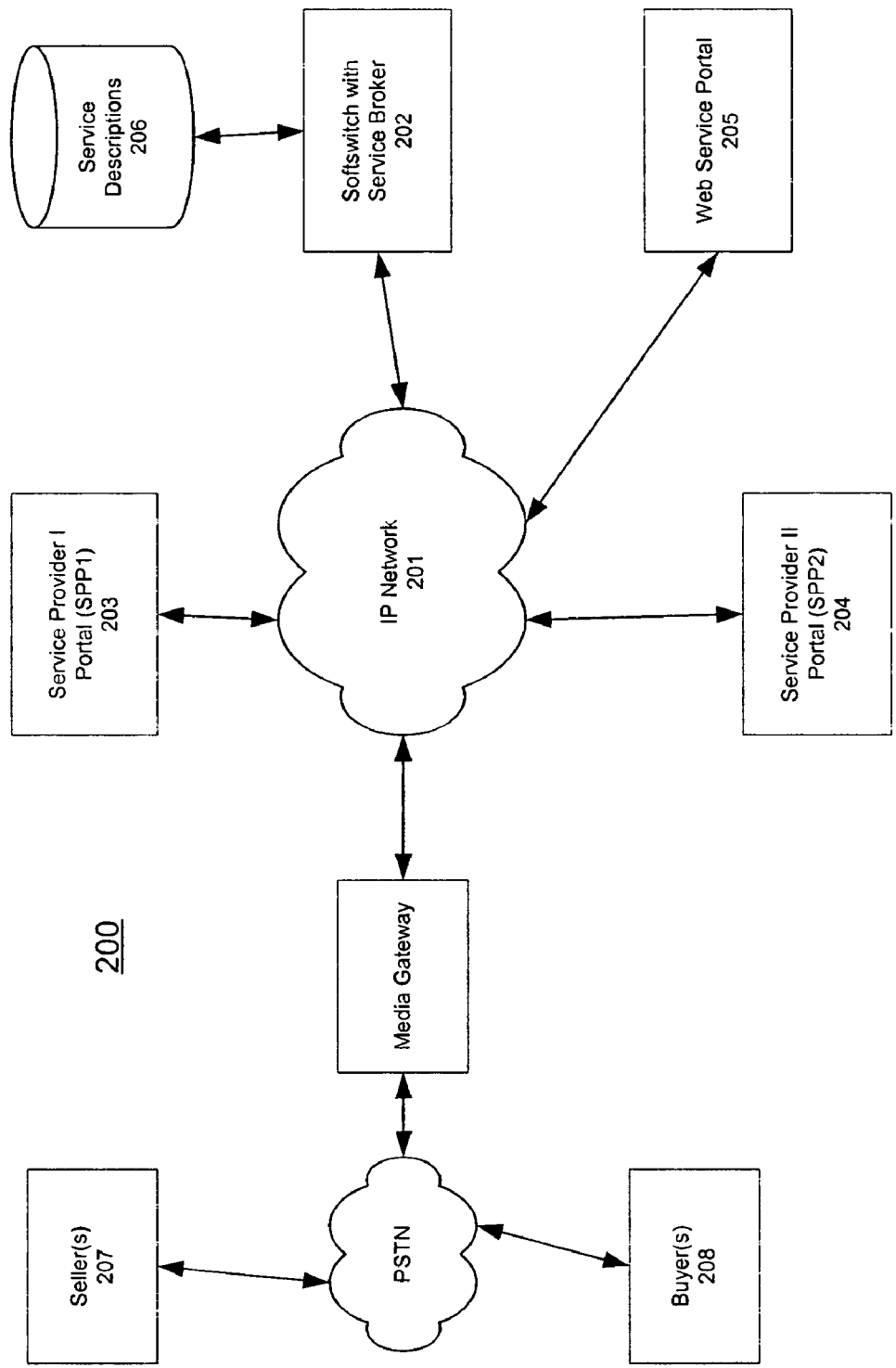
FIG. 2 is a block diagram illustrating an example of a service transaction via a service broker, according to one embodiment of the invention.

Generic description of services through profile/model/invocation definition allows exposing voice services beyond native voice execution environment to be discovered and used more widely on the web. This opens possibilities for new business models for voice services. FIG. 2 is a block diagram illustrating an example of a service transaction via a service broker, according to one embodiment of the invention. Referring to FIG. 2, in this example, buyer 208 is running a service on Web service portal 205, which is looking for some items available for sale. Buyer 208 has all his/her credentials and financial information available on the Web service portal 205 to complete transaction, as well as a phone number and time to call to personally finalize acquisition of items.

A prospective seller (e.g., seller 207) subsequently posts information about some items for sale including a phone number and time to call. Through softswitch with a service broker 202 and service description describing each of the services available, Web service portal 205 has found the seller items matching search criteria and price range. Web service portal launches voice service portals search for the service that is capable to do inverted call and has the best price between buyer domain and seller domain at the preferred by parties call time. In this example, the Web service portal 205 found two service providers 203 and 204 offering inverted calls with the best rate offered by service provider 203.

Web service portal 205 then initiates transaction for the call with service provider 203 and service provider 203 verifies financials, approves transaction. Web service portal 205 requests to make call at the given time. Clients talks and commit to the deal. After talk is over buyer's credit card is debited. Web service portal 205 finalizes the item purchase.

This example illustrates possibility of transactional sale of voice service, with unlimited customer base (through the web) and simplified billing (accounting). This (transactional) model makes voice services more relevant to the web and numerous applications, which can benefit from integration with voice. This model also may serve as an alternative way of some traditional voice services distribution (like calling card).

Traditionally, to specify interactions among multiple services, each service needs to have a code specifically referring to some or all other services, as shown in FIG. 6A. A new service has to be analyzed on interaction with other existing services. After the new service is developed, it may need to be tested with all interacting services. As a result, it slows down the service development of a product with a significant number of services involved and makes service integration costly.

According to one embodiment, a service profile and service broker interaction resolution mechanism breaks this complexity through an analysis of a few service profile attributes of interacting services. With the new mechanism, there is no service explicit reference to each other. Services are agnostic to each other and to the method of resolution implemented by the service broker.

A new service may be characterized by a profile and this enables the service broker to unambiguously resolve interaction attempt with any other services. The analysis and testing of services are simplified and the development time is reduced. Ultimately, it is possible to provide real-time service integration, which opens the ways to interactive Ad-Hoc complex voice/Web service creations.

In one embodiment, a service broker may be implemented as a component introduced with a new service framework. A service framework defines service architecture principles and requirements to service profiles. A services framework may include one or more rules by which services have to be appropriately defined and described, as shown in FIG. 6B, to enable automated resolution of service conflicts by the service broker. In one embodiment, a service description may include a service profile defining what the respective service is doing, a service model defining how service have to be executed (e.g., service process), and/or a service invocation defining how service could be invoked by any service execution entity in the network. An example of a service description is shown in FIG. 7A.

Service architecture is designed such that service logic is not aware about any other services and the service broker is service agnostic. The service broker has predefined service execution model based on a strict isolation of individual services. The service broker analyzes service descriptions and makes decision about services compatibility and inter-working. This helps to resolve service conflicts and interactions at several phases of service delivery, including service design, service provision, and/or service execution.

In one embodiment, when a service is designed, the service broker helps designer to plan testing and development of new features through providing inter-working map (e.g., a matrix) with other existing services.

| No. | Feature Title | 1 | 2 | 3 | 4 | 5 | 6 | 7 | 8 |
|-----|---------------|---|---|---|---|---|---|---|---|
| 1 | Call Origination | — | I | A | A | A | A | A | A |
| 2 | Call Termination | A | — | I | I | I | I | A | A |
| 3 | Call Waiting | A | I | — | I | I | I | N | N |
| 4 | Call Forward Busy | A | I | I | — | I | A | A | A |
| 5 | Call Forward Unconditional | A | I | I | I | — | A | A | A |
| 6 | Call Forward No Answer | A | I | A | A | A | — | A | A |
| 7 | Call Transfer | A | A | N | A | A | A | — | A |
| 8 | Call Hold | A | A | N | A | A | A | A | — |

| Code | Interation type |
|------|-----------------|
| A | "Allowed" and means that the two features do not interact. The features may be assigned simultaneously to the same subscriber and both features can be active during call setup. |
| I | "Interact," meaning that the two features interact with each other (interaction of precedence or influence execution of each other). |
| N | "Not Allowed" it means that the two features cannot be simultaneously assigned or active. |

This is achieved through service broker querying with proposed service formal description. When a service is assigned, according to one embodiment, if an administrator attempts to add a particular service to a service pack, the service broker analyzes service compatibility with the services already in the service pack. If they are incompatible, the service broker does not allow addition and provides the explanation and list of other services, which causes incompatibility for administrator to reconsider pack composition. Thus, many potential conflicts are resolved at service assignment time, when service subscribes for the events with service broker. During a run-time execution, according to one embodiment, service broker utilizes a pre-compiled for run time efficiency service inter-working decision matrix to distribute network events to inter-working services in such manner, that desirable service behavior achieved (like correct sequence of execution, correct timing, etc.).

Figure 3A:
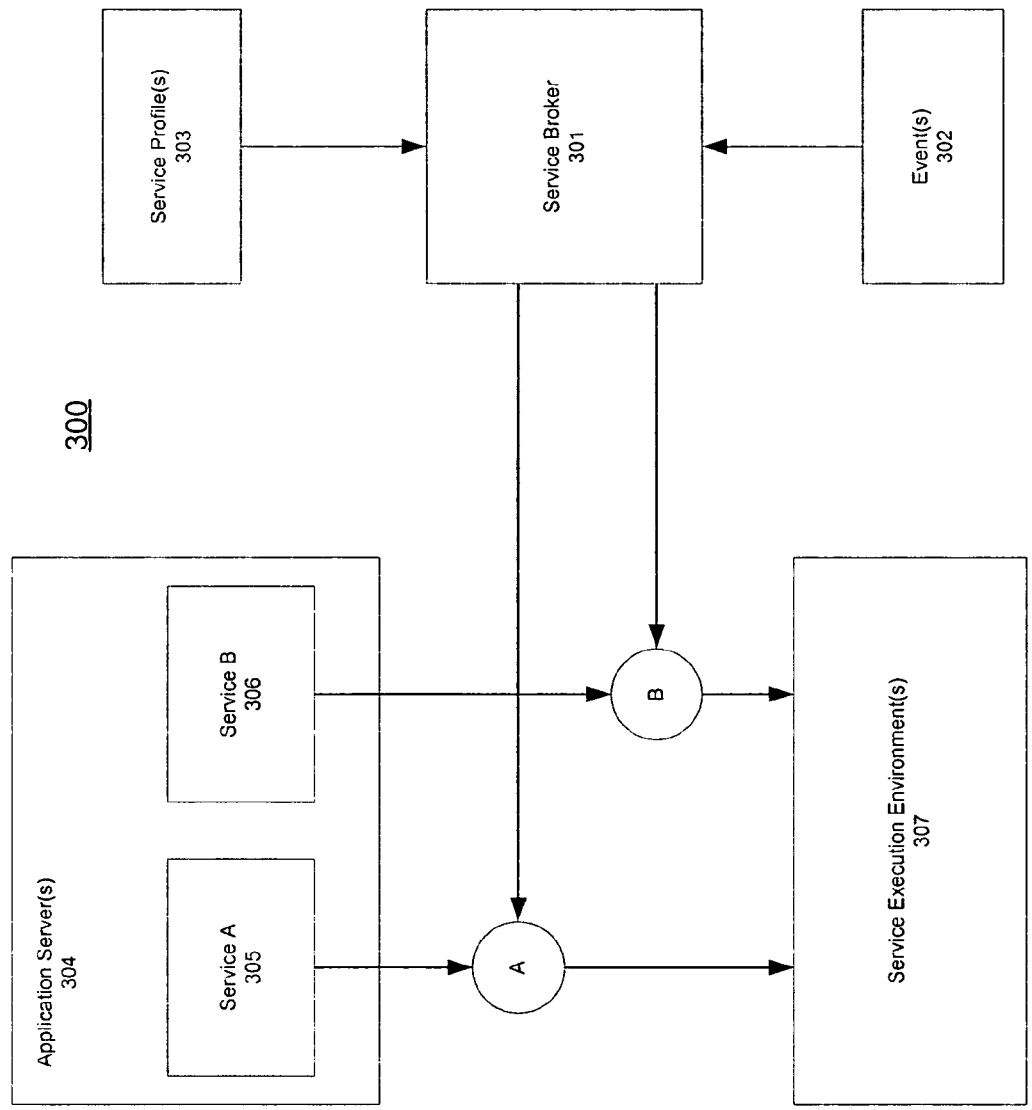
FIGS. 3A and 3B are block diagrams illustrating an exemplary configuration having a service broker according to certain embodiments.

FIG. 3A is a block diagram illustrating an exemplary configuration having a service broker according to one embodiment. For example, exemplary configuration 300 may be implemented as a part of softswitch (e.g., softswitch 102 of FIG. 1) of a telecommunications network. Referring to FIG. 3A, exemplary configuration 300 includes a service broker 301 communicatively coupled to one or more application servers 304 and one or more service execution environments 307. The application servers 304 may provide a number of services for a variety of communication protocols (e.g., SIP, H.323, etc.), including services 305 and 306. In response to a telecomm event (also referred to a telephony call event or a call event) from event module 302 (which may be a part of a call control engine), the service broker 301 accesses one or more service profiles 303, where each service is described via a corresponding service profile, similar to an exemplary service description shown in FIG. 7A.

According to one embodiment, service profile is following the format of the standard OWL-S schema for the service description. The OWL-S initiative is part of the Next Generation Web services, so called Semantic Web. The selection of the standard way of doing service profile is the foundation for the future interoperability of services developed by different vendors. The current proposal extends applicability of this standard to the internal SoftSwitch architecture and allows using it as a standard service interface of the SoftSwitch. According to OWL-S standard the main elements of the service profile are: service profile, service process and service grounding (profile, model and invocation on the FIG. 7A).

In one embodiment, an example of fragments of service profiles for certain services may be implemented as follows:

the application servers, in response to a telecomm event 352. Other configurations may exist.

Figure 4:
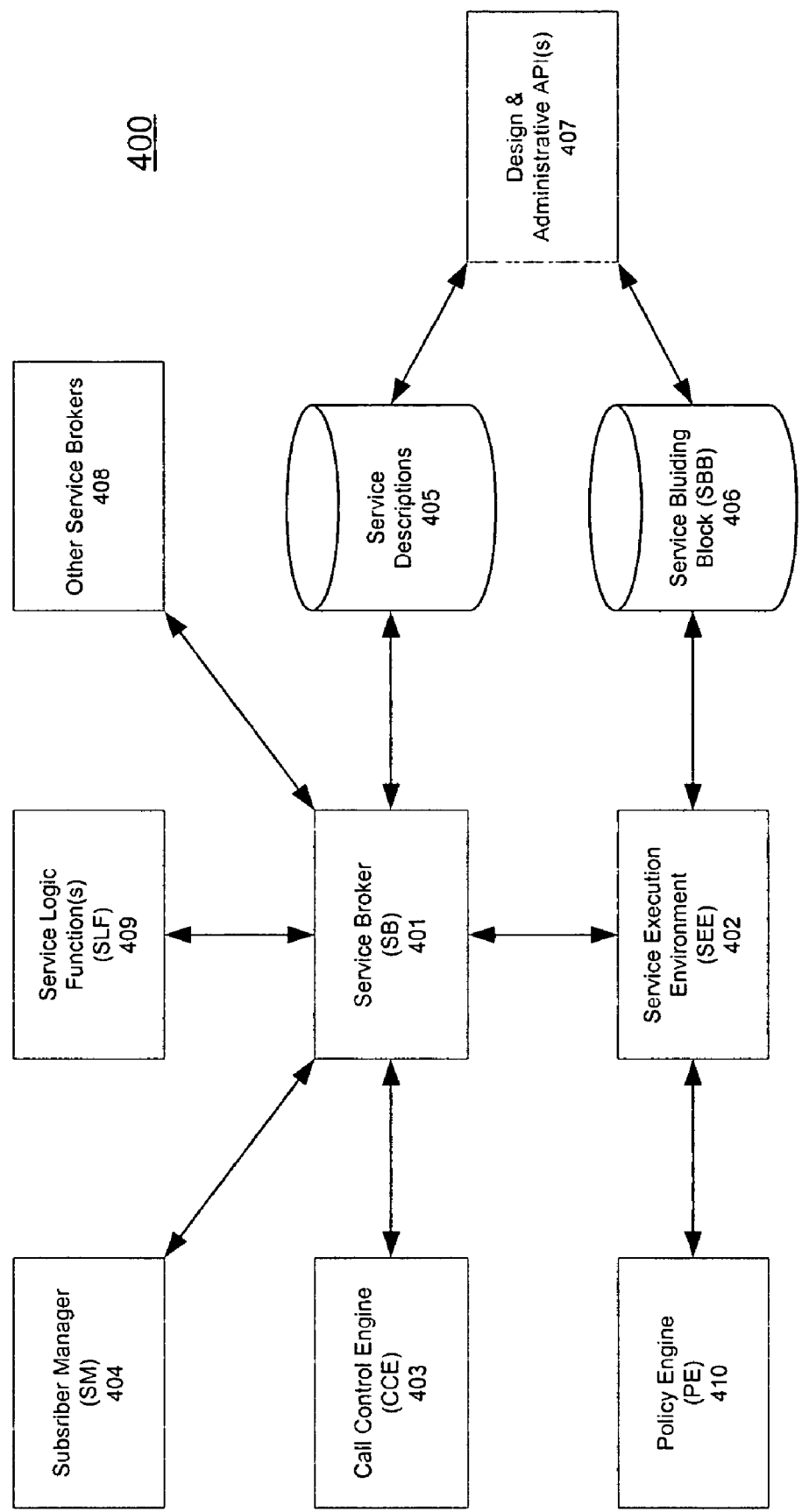
FIG. 4 is a block diagram illustrating an exemplary softswitch according to one embodiment of the invention.

FIG. 4 is a block diagram illustrating an exemplary softswitch according to one embodiment of the invention. For example, exemplary softswitch 400 may be implemented as a part of softswitch 102 of FIG. 1. Referring to FIG. 4, according to one embodiment, exemplary softswitch 400 includes a service broker 401 communicatively coupled to a subscriber manager (SM) 404, a call control engine (CCE) 403, a service execution environment (SEE) 402, and service descriptions 405. In addition, the service broker 401 is also coupled to other entities, such as, for example, other service logic functions (SLFs) 409 and other service brokers 408. The SEE may be coupled to a policy engine (PE) 410 and service building blocks (SBBs) 406.

According to one embodiment, in response to a telecomm event received from a subscriber and forwarded by CCE 403, the service broker 401 interrogates with SM 404 to determine what services the subscriber has subscribed. The SM 404 may maintain a database to store subscriber records, similar to those shown in FIG. 8B. Alternatively, the SM 404 may access a remote server to retrieve such information. In addition, the service broker 401 determines what services may handle such an event. In one embodiment, the service broker 401 may access a database, similar to one shown in FIG. 8A, for such determination. For each service, the service broker 401 accesses the service description depository 405 to analyze each service to determine the interaction and conflicts among the services. Once one or more services without conflicts have been identified, the service broker 401 communicates with the SEE 402 to execute the identified services.

In one embodiment, the service descriptions 405, as shown in FIGS. 6B and 7A, may be designed by a designer and/or provisioned by an administrator, using one or more reusable

| Feature Title | Service Grounding | Service Model | Service Profile |
|---|---|---|---|
| 3 Way Call | SEE:<ipaddress:port:msgQId> SBB: <SBB ID> | Pre-conditions: user in call connected, pressed flash, dialed digits and then flash again | Party A, B & C all talk to each other via Media Server |
| Call Waiting | SEE:<ipaddress:port:msgQId> SBB: <SBB ID> | Pre-conditions: user in call connected, has a new incoming call | Allows a user to receive another call while its already on a call |
| Call Transfer | SEE:<ipaddress:port:msgQId> SBB: <SBB ID> | Pre-conditions: user in call connected, pressed flash, dialed digits and then hung up | Allows a user to transfer its current call to a 3rd party |
| Call Hold | SEE:<ipaddress:port:msgQId> SBB: <SBB ID> | Pre-conditions: user in call connected, pressed flash | Allows a user to put its current call on hold |

In this embodiment, since multiple services described in the service profiles 303 may be capable of handling the event, the service broker 301 enables multiple services (e.g., services 305-306) to compete for the same event. In addition, the service broker 301 may further determine, at real-time via an analysis of the service profiles 303, which of the services should receive the event first, whether some or all of the services can handle the event substantially concurrently, and/or whether other service may be involved.

Figure 3B:
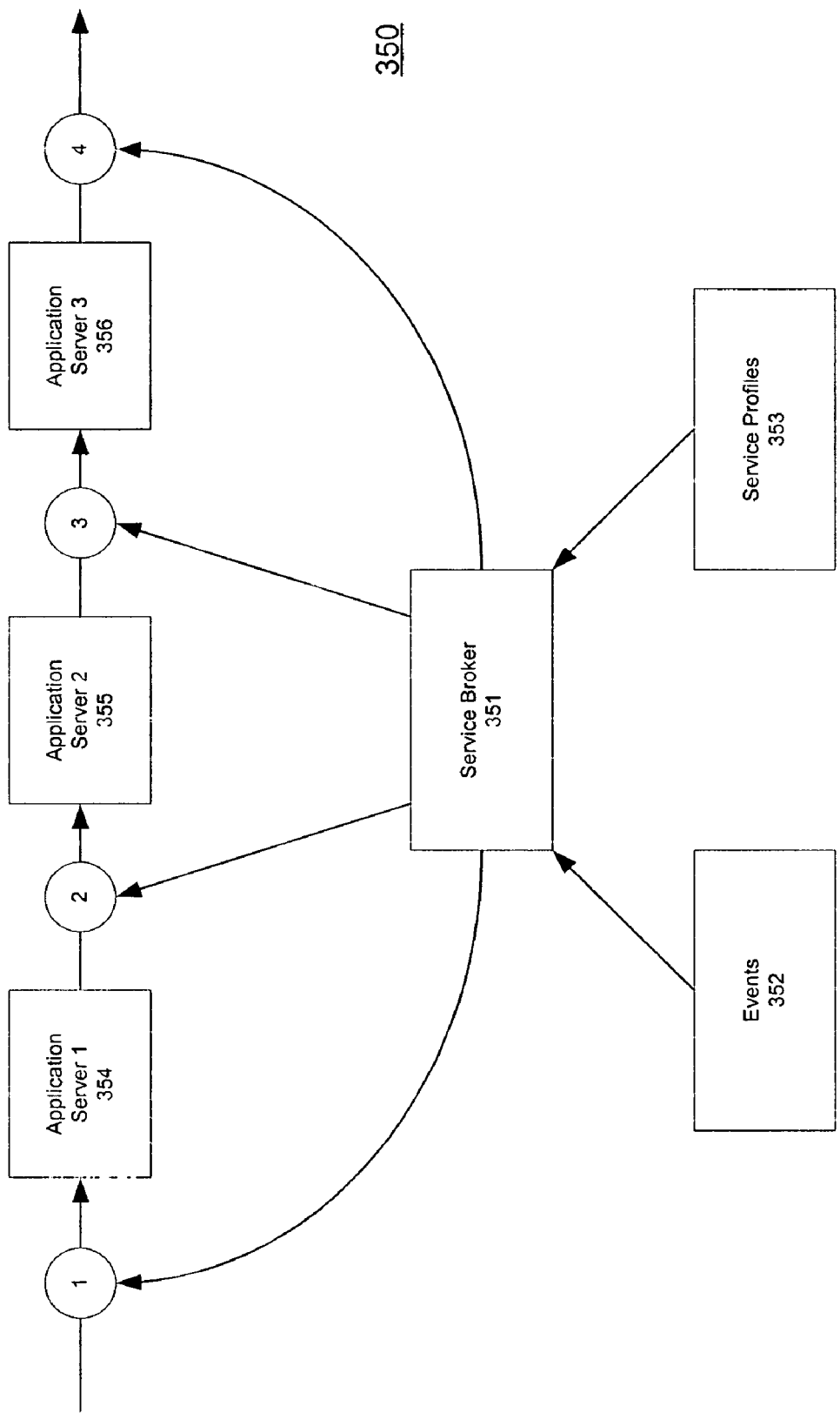

According to an alternative embodiment, the service broker may enable multiple application servers to compete for the same event as shown as exemplary configuration 350 in FIG. 3B. Referring to FIG. 3B, service broker 351 is able to resolve any conflicts among the multiple application servers 354-356 based on the service profiles 353 corresponding to SBBs 406. Each SBB of SBBs 406 may further include one or more reusable primitives, as shown in FIG. 7B.

The service building blocks utilize the reusable primitives and a programming scripting (e.g., XML scripting) may be used to tie all of the SBBs together to create a service set in a form of service description. The SBBs are agnostic to protocol and signaling. That is, the SBBs work with most of the protocols and signaling systems supported.

According to one embodiment, call related primitive examples may include, but is not limited to:
Start call leg
Release call leg
Hold call leg
Collect digits
Connect leg to bridge According to one embodiment, intelligent network trigger primitive examples may include, but is not limited to:
 AIN_InfoAnalyzed
 AIN_InfoCollected
 AIN_ResourceClear According to one embodiment, routing policy primitive examples may include, but is not limited to:
 Route request
 Location Request According to one embodiment, user service primitive examples may include, but is not limited to:
 Access subscriber policies and privileges
 Subscriber authentication and authorization
 Subscriber self-provisioning According to one embodiment, announcement primitive examples may include, but is not limited to:
 Announcement ID request
 Play announcement from IVR (interactive voice recording)
 Collect digits from IVR According to one embodiment, SBB internal primitive examples may include, but is not limited to:
 Send message
 Set timer Other primitives, such as, for example, external database queries and/or API primitives (e.g., PARLAY, VXML, etc.), may be implemented.

According to a further embodiment, the service broker 401 may communicate with other service brokers 408 in order to invoke some other services to interact with each other to perform one or more tasks required by the event.

According to one embodiment, a service broker may be implemented as a part of a service execution environment. There are a number of motivations for making service broker a component of a service execution environment, including operational scalability and a common framework for service introduction, delivery, and/or execution in a multi-provider environment, which covers full service life cycle. In addition, a service broker enables a reduction in the complexity of real time services integration (e.g., framework based integration vs. customized integration of each individual service). In one embodiment, this may be accomplished by decoupling of application services from underlying network resources and system services and a creation of secure environment for discovery of system capabilities at service design time. Further, a service broker enables the reuse of common system services through capability exchange, registration, and/or event notification, as well as through SBBs which leads to solving service interaction problem, billing consolidation, providing services troubleshooting/tracing, and/or bridging between voice and data/Web services, etc.

The service interaction problem is one that is particularly difficult to tackle. This is the problem, which ultimately defines operational scalability and ease of integration. NGN is adding new challenges to solving service coordination/interaction problem. With NGN, there is an increase in the number of service execution environments (e.g., proxies, end user devices, application servers, media servers, etc.), more diversity of service execution environments (e.g., SIP, Parlay, IN, etc.), and influx of new developers (e.g., Web application developers, 3rd party service providers, end users).

NGN service environment gets more complex and requires new service coordination function. The service coordination/interaction problem needs to be solved on the more generic level and in more formal way. The latest advances in semantic Web development have to be used. The service broker may solve this central for services problem and to deliver to customer "plug-and-play" integration environment for the future generation services.

Figure 5:
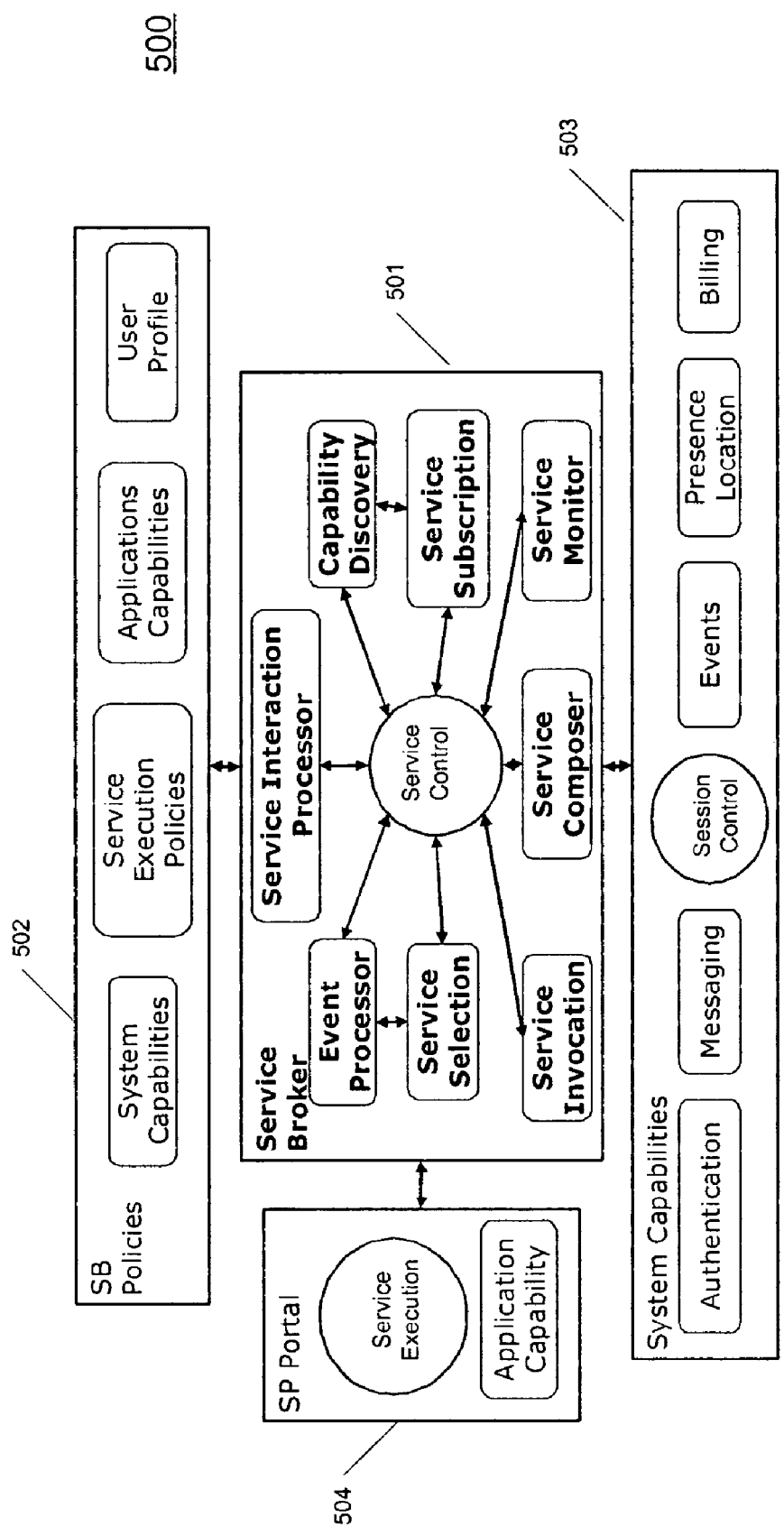
FIG. 5 is a block diagram illustrating an exemplary softswitch according to another embodiment of the invention.

FIG. 5 is a block diagram illustrating an exemplary softswitch according to another embodiment of the invention. For example, exemplary softswitch 500 may be implemented as a part of softswitch 102 of FIG. 1. Referring to FIG. 5, exemplary softswitch 500 includes a service broker 501 to mediate between a service execution environment 504 (e.g., one or more application servers) and system resources represented as system capabilities 503, which may be a part of a call control engine. In addition, service broker 501 accesses the service broker policies 502 to determine what services are available for perform certain tasks to handle a telecomm event.

During a design time, according to one embodiment, developers can obtain a view, (through discovery or advertisement) of system capabilities and structured descriptions of reusable common system services stored it service broker policies repository and use them for service development. In one embodiment, system capabilities examples include:
 Basic call/session capabilities
 Basic Voice services
 Presence and location capabilities
 Subscriber Management and Billing services
 Messaging services
 Authentication services In addition, system service capabilities include a profile of each system service. This profile is utilized for discovery of this service through queries or alternatively could be advertised by the service broker on the service provider portal 504. System service capabilities also include service building blocks of system services.

According to one embodiment, application services communicate with the service broker regarding their capabilities (e.g., prerequisites/consequences, input data and resources required, possible interactions). Application services also subscribe to system/network events. Events within the service broker may be processed by the service interaction process. Service capabilities along with interaction profile are stored in the service broker policy repository. Service registration/subscription function enables application services to discover system level capabilities and enables the service broker to discover application services capabilities. This discovery makes service interaction resolution seamless.

In one embodiment, the stored capabilities may include a service profile (e.g., service required inputs and service outcomes), a service model (e.g., rules for service execution and composition with other services), and rules of service usage (which is declarative API for service), similar to those shown in FIGS. 6B and 7A. For the services, which were developed without following described here framework, a declarative adapter (e.g., an API) may need to be created to allow registration with the service broker.

In one embodiment, a service interaction process analyzes the service profile of each service. The service profile provides the service model rules for service execution and/or composition, as well as general service execution policies from the service broker policies repository. The service interaction process resolves service interaction problems either in real time or during simulation.

A service composition covers service chaining/repetition and other complex forms of service composition. A service model within application capabilities contains the information necessary to select and compose services. Service broker manipulates these service models to achieve the required task. A service model provides declarative specifications of the prerequisites and consequences of individual service use thus facilitating service composition and interoperation.

Service tracing/troubleshooting helps to establish a chain of event and trace of information involved in service execution. It could be an advertised or discovered system level service for application service providers. In a case of a service chain failure, the problem is logged and the service attempts to exit gracefully. The service broker with events processor takes care of events subscribed by application services.

In one embodiment, the service broker enables monitoring of service requests, reporting system status to application services for application/user corrective actions. Further, the service broker enables aggregation of call detail records (CDRs) generated by applications/system services for complex calls/sessions, when more then one service is involved. In one embodiment, XML (extensible markup language) based CDR parameters and/or SIP extensions for billing may be implemented to facilitate a flexible aggregation function.

Referring to FIG. 5, according to one embodiment, the service broker policies repository 502 is a logical entity having profiles stored on various database locations (e.g., the policy engine 410, subscriber manager 404, EMS, etc). The service broker queries the repository to collect information needed for execution of application services.

In one embodiment, system and applications capability descriptions are structured similarly and may include:

A service semantic description, which is normalize across substantially all services (system and application) unambiguous definition of service actions on defined in service execution policies resources. Description of actions is performed in a formal manner, which implicitly includes service time constrains. Structure of service action descriptions and service action taxonomy will require standardization.

Reference map of available to the service resources.

Explicit time constraints and explicit service interoperability rules.

According to one embodiment, service execution policies include a description of resources following W3C resource definition framework (RDF) and derived ontology representations (e.g., OWL, DAML-S), which may include:

Resource ontology contains hierarchical description of resources and available (e.g., active) instances and rules/ constraints of resource usage.

Abstract definition of service process (model) as a basis for services composition and execution.

Empirical rules of service interaction resolution.

The service interaction processor is a semantic processor for processing of special semantic descriptions of services, service actions, and/or service profiles, and provides interaction resolution decisions automatically from discovered relationships. This component reduces some or all of the traditional service integration work and is a key to operator cost reduction and rapid service development/introduction.

According to one embodiment, the service broker utilizes internal service building block events as well as external event collectors to provide system/network event notification for application services. Event collectors can function across multiple system services (e.g., call/session, messaging, billing, etc.).

As a result, a service broker enables integration of the best of breed service application from multiple vendors available on the market and provides an environment which supports changing context for service execution and carries service provider through transitional period to NGN services, when traditional services and quickly changing NGN services have to coexist. In addition, the service broker enables an execution of services in heterogeneous service environment (e.g., SIP, AIN, Parlay, etc.) and provides transactional (real time) integration with implication of significantly reduced integration cost for service provider. Furthermore, the service broker provides a bridge between the web services and enables new business models of service delivery and provides faster customization of services.

Figure 9:
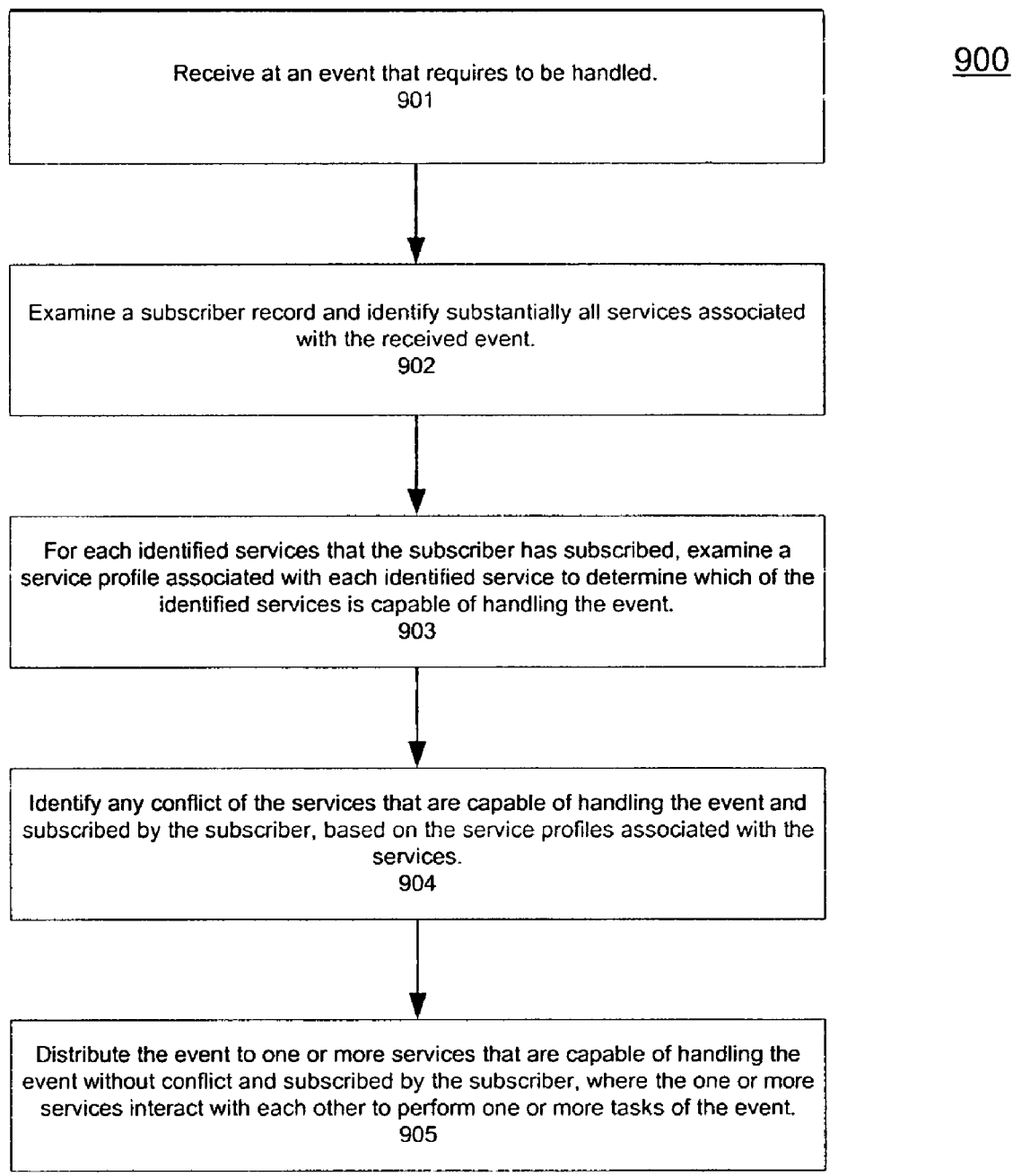
FIG. 9 is a flow diagram illustrating an exemplary process for brokering services according to one embodiment of the invention.

FIG. 9 is a flow diagram illustrating an exemplary process for brokering services according to one embodiment of the invention. The exemplary process 900 may be performed by processing logic that may comprise hardware (e.g., circuitry, dedicated logic, etc.), software (such as is run on a general-purpose computer system, a server, a router, or a dedicated machine), or a combination of both. For example, exemplary process 900 may be performed by a service broker.

In one embodiment, exemplary process 900 includes, but is not limited to, in response to a telecomm event from a subscriber to be serviced by a plurality of services, for each of the plurality of services, examining a service description associated with the respective service to identify which of the plurality of service is capable of handling the telecomm event, and distributing the telecomm event to one or more of the identified services that are capable of handling the telecomm event, wherein the telecomm event is processed by the one or more services.

Referring to FIG. 9, at block 901, the processing logic receives an event from a subscriber that requires to be serviced. The event may be forwarded by a call control engine. In response to the event, at block 902, the processing logic examines a subscriber record associated with the subscriber to identify which of the services the subscriber has subscribed. At block 903, for each of the identified services, the processing logic examines a service profile to determine which of the identified service is capable of handling the event. Optionally, at block 904, the processing logic may identify any conflicts among the services that are capable of servicing the event and subscribed by the subscriber, based on the service profile analysis. At block 905, the processing logic distributes the event to one or more services that are capable of handling the event without conflicts and subscribed by the subscriber, where the one or more services may interact with each other to perform one or more tasks associated with the event. FIG. 10 is a block diagram illustrating an exemplary of an event/service table which may be used by the above operations according to certain embodiments of the invention. Other operations may also be performed.

Thus, a service broker of telecommunications networks has been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, the present invention is not described with reference to any particular programming language. It will be appreciated that a variety of programming languages may be used to implement the teachings of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for processing telephony call events from a plurality of subscribers, wherein each of the subscribers is subscribed to one or more services, comprising:
   receiving a telephony call event from a subscriber and, for each of the services subscribed to by the subscriber, examining a service description associated with the respective service to identify which of the services are capable of handling the telephony call event, the service description semantically describing the respective service, and wherein the service description associated with each respective service comprises a service profile for defining the respective service provided to the subscriber and a resource usage model used by the respective service;
   distributing the telephony call event to one or more of the identified services that are capable of handling the telephony call event, wherein the telephony call event is processed by the one or more of the identified services; and
   repeating the receiving and distributing steps for each of the plurality of subscribers.

2. The method of claim 1, wherein the service description further comprises:
   a service model for defining how the respective service is to be executed in an execution environment; and
   a service invocation for defining how the respective service is invoked by the execution environment.

3. The method of claim 2, wherein a programming language of the service description is configured independent of the execution environment, and further wherein the execution environment executes the one or more services in a manner specified by the service description.

4. The method of claim 3, wherein the programming language comprises an extensible mark-up language (XML).

5. The method of claim 3, wherein the service description comprises one or more reusable service building blocks linked by the programming language, each of the reusable service building blocks specifying a component of a service described by the service description.

6. The method of claim 5, wherein each of the reusable service building blocks comprises one or more reusable primitives, each of the reusable primitives specifying a component of a reusable service building block.

7. A machine-readable medium having executable code to cause a machine to perform a method of a network access device, the method comprising:
   receiving a telephony call event from a subscriber subscribed to one or more services and, for each of the services, examining a service description associated with the respective service to identify which of the services are capable of handling the telephony call event, the service description semantically describing the respective service, and wherein the service description associated with each respective service comprises a service profile for defining the respective service provided to the subscriber and a resource usage model used by the respective service;
   distributing the telephony call event to one or more of the identified services that are capable of handling the telephony call event, wherein the telephony call event is processed by the one or more of the identified services; and
   repeating the receiving and distributing steps for each of a plurality of subscribers.

8. The machine-readable medium of claim 7, wherein the service description further comprises:
   a service model for defining how the respective service is to be executed in an execution environment; and
   a service invocation for defining how the respective service is invoked by the execution environment.

9. The machine-readable medium of claim 8, wherein a programming language of the service description is configured independent of the execution environment, and further wherein the execution environment executes the one or more services in a manner specified by the service description.

10. The machine-readable medium of claim 9, wherein the service description comprises one or more reusable service building blocks linked by the programming language, each of the reusable service building blocks specifying a component of a service described by the service description.

11. The machine-readable medium of claim 10, wherein each of the reusable service building blocks comprises one or more reusable primitives, each of the reusable primitives specifying a component of a reusable service building block.

12. A system for processing telephony call events from a plurality of subscribers, wherein each of the subscribers is subscribed to one or more services, the system comprising:
   an application module to provide a plurality of services to a plurality of subscribers;
   a call control module to manage telephony call events from a plurality of subscribers; and
   a service broker communicatively coupled to the application module and the call control module, wherein the service broker is operable to (i) receive a telephony call event associated with a subscriber from the call control module, (ii) determine to which of the plurality of services the subscriber is subscribed, (iii) examine a service description associated with each of the subscribed services to identify which of the subscribed services are capable of handling the telephony call event, and (iv) distribute the telephony call event to the application module for providing the identified services to the subscriber.

* * * * *